US009614956B2

(12) United States Patent
Carpenter et al.

(10) Patent No.: US 9,614,956 B2
(45) Date of Patent: Apr. 4, 2017

(54) PROVIDING A PHONE CALL WHICH INDICATES CONTEXT TO A CALL RECEIVING DEVICE (71) Applicant: Citrix Systems, Inc., Fort Lauderdale, FL (US)

(72) Inventors: Viral V. Carpenter, Goleta, CA (US); Sneha Sachidananda, Goleta, CA (US); Yiming Li, Santa Barbara, CA (US); Scott Ross, Santa Barbara, CA (US)

(73) Assignee: GetGo, Inc., Fort Lauderdale, FL (US)

( * ) Notice: Subject to any disclaimer, the term of this patent is extended or adjusted under 35 U.S.C. 154(b) by 0 days.

(21) Appl. No.: 15/064,000

(22) Filed: Mar. 8, 2016

(65) Prior Publication Data
US 2016/0323441 A1 Nov. 3, 2016

Related U.S. Application Data (60) Provisional application No. 62/154,416, filed on Apr. 29, 2015.

(51) Int. Cl.
H04M 1/56 (2006.01)
H04M 15/06 (2006.01)
H04M 3/42 (2006.01)
H04M 3/02 (2006.01)
G06F 3/0482 (2013.01)
G06F 3/0484 (2013.01)
G06F 17/30 (2006.01)

(52) U.S. Cl.
CPC ...... *H04M 3/42042* (2013.01); *G06F 3/0482* (2013.01); *G06F 3/04842* (2013.01); *G06F 17/30525* (2013.01); *H04M 3/02* (2013.01)

(58) Field of Classification Search
CPC ... H04L 65/1006; H04L 3/002; H04L 3/9082; H04M 1/2472; H04M 1/2535; H04M 1/575; H04M 2203/2038; H04M 3/42042; H04M 3/4365; H04M 2203/6081; H04M 3/5158
USPC ............ 379/142.01, 142.04, 142.06, 142.09, 379/142.17, 142.03
See application file for complete search history.

(56) References Cited

U.S. PATENT DOCUMENTS

8,223,938 B2 7/2012 Cassanova et al.
8,942,368 B2 1/2015 Chatterjee et al.
9,148,431 B2 9/2015 Chmaytelli
(Continued)

Primary Examiner — Binh Tieu
(74) Attorney, Agent, or Firm — BainwoodHuang (57) ABSTRACT A technique provides a phone call from a caller device operated by a human caller to an answerer device operated by a human answerer. The technique involves receiving a call request from the caller device. The call request includes a call button identifier which uniquely identifies a browser call button which is rendered on the caller device to the caller. The technique further involves identifying a source phone number based on the call button identifier. The technique further involves placing a call communication to the answerer device operated by the human answerer. The call communication indicates the source phone number as a source of the call communication. Accordingly, if the answerer device already has the context of associated with the source phone number already saved (e.g., in a contact list), the answerer device is able to automatically display that context in response to the call.

21 Claims, 7 Drawing Sheets (56) References Cited

U.S. PATENT DOCUMENTS

| | | | | |
|---|---|---|---|---|
| 2005/0243982 A1* | 11/2005 | Starbuck | ............ | H04M 1/2478 |
| | | | | 379/88.23 |
| 2010/0002685 A1* | 1/2010 | Shaham | ............... | H04M 3/002 |
| | | | | 370/352 |
| 2011/0096914 A1* | 4/2011 | Eng | ..................... | H04M 1/2472 |
| | | | | 379/142.06 |
| 2015/0296081 A1* | 10/2015 | Jeong | ................. | H04M 3/4365 |
| | | | | 379/142.01 |

* cited by examiner

PROVIDING A PHONE CALL WHICH INDICATES CONTEXT TO A CALL RECEIVING DEVICE

CROSS-REFERENCE TO RELATED APPLICATIONS

This application claims priority to U.S. Provisional No. 62/154,416, entitled "PROVIDING A PHONE CALL WHICH INDICATES CONTEXT TO A CALL RECEIVING DEVICE" and filed on Apr. 29, 2015, the contents and teachings of which are hereby incorporated by reference in their entirety.

BACKGROUND

Some conventional webpages provide users with buttons that enable the users to make calls over the Internet. Along these lines, a user may launch a browser application on the user's device, and then navigate the browser application to a particular webpage. Next, the user activates (e.g., clicks on) a button of the webpage, and the browser application (or another program launched by the browser application) responds by calling another party over the Internet.

The other party may receive the call on a telephone via the traditional public Switched Telephone Network (e.g., a mobile phone, a land-based phone, etc.). Alternatively, the other party may receive the call on another computerized device via Internet telephony (e.g., packet-switched Voice of IP). In some situations, the other party may have voicemail available thus enabling the user to leave a message if the call is not answered.

SUMMARY

An improved technique is directed to providing, to a call receiving device, a phone call which indicates (e.g., displays) context such as information about a particular item on a webpage that a caller is calling about. Accordingly, a human operating the call receiving device knows why the caller is calling and may decide to answer the phone call, or let the call transfer to voicemail (i.e., the human may screen the call and only answer calls regarding certain contexts). Moreover, the call receiving device may be configured to display, in a voicemail listing, the contexts of multiple voicemail messages thus alleviating the human from having to listen to every voicemail message.

It should be understood that the context of a phone call is different from conventional Caller ID which displays the telephone number and/or caller name of an incoming call. That is, Caller ID simply identifies the caller of a call. In contrast, the context indicates other information such as the topic or subject matter of a call (e.g., an item on a webpage that the caller has a question about). Accordingly, the human receiving the call may decide not to take the call if the human considers the context of the call to be of low priority, unrelated to a matter at hand, and so on.

One embodiment is directed to a computer-implemented method of providing a phone call from a caller device operated by a human caller to an answerer device operated by a human answerer. The method includes receiving, by processing circuitry, a call request from the caller device. The call request includes a call button identifier which uniquely identifies a browser call button which is rendered on the caller device to the caller. The method further includes identifying, by the processing circuitry, a source phone number based on the call button identifier. The method further includes placing, by the processing circuitry, a call communication to the answerer device operated by the human answerer (i.e., an incoming call). The call communication indicates the source phone number as a source of the call communication. Accordingly, if the answerer device has the context associated with the source phone number already saved (e.g., as a contact in a contact list), the answerer device is able to automatically display that context in response to the incoming call.

In some arrangements, the method further includes, prior to receiving the call request, programming a contact list of the answerer device with an association between (i) the source phone number and (ii) a context for the browser call button to direct the answerer device to display the context to the human answerer in response to the answerer device receiving the call communication. Accordingly, phone circuitry of the answerer device can simply retrieve and display the context from the caller information saved in the contact list.

In some arrangements, the method further includes, prior to programming the contact list of the answerer device, receiving a button registration request from the human answerer. In these arrangements, the method further includes, in response to the button registration request, (i) adding an entry to a database, the entry associating the call button identifier with the source phone number, (ii) initiating a contact list programming operation to program the contact list of the answerer device with the association, and (iii) providing the human answerer with a button object to deploy on a webpage as the browser call button, the button object including the call button identifier.

In some arrangements, identifying the source phone number includes (i) searching the database based on the call button identifier to retrieve the entry associating the call button identifier with the source phone number among other entries of the database, and (ii) extracting the source phone number from the entry to use the source phone number as a caller identifier of the call communication to the answerer device.

In some arrangements, the webpage includes multiple existing button objects which have been deployed as browser call buttons, each of the existing button objects having an identical graphical appearance on the webpage. For example, the webpage may display a column of webpage items each having a different browser call button, and invite a human viewing the webpage to make a call regarding a particular webpage item by clicking on a respective browser call button. In these arrangements, providing the human answerer with the button object may include provisioning the button object to have the identical graphical appearance as the existing button objects.

It should be understood that it is possible to change the look and feel of a button object. Along these lines, in some arrangements, at least some of button objects for certain contexts have different graphical appearances than those of other button objects for other contexts.

In some arrangements, placing the call communication to the answerer device includes providing the source phone number as a caller identifier of the call communication to the answerer device to enable the answerer device to (i) retrieve the context for the browser call button from the contact list and (ii) display the context for the browser call button to enable the answerer to screen the call communication.

In some arrangements, placing the call communication to the answerer device continues until the answerer operates the answerer device to answer the call communication. Here, the answerer device can display the context thus allowing the human answerer to screen calls based on context.

In some arrangements, placing the call communication to the answerer device continues until the call communication is processed by a voicemail service of the answerer. The voicemail service of the answer displays, in a voicemail message listing on the answerer device, a voicemail message item having the context for the browser call button. Here, the answerer device can display the context of the voicemail message thus allowing the human answerer to screen the voicemail message based on context.

Another embodiment is directed to an electronic apparatus which includes a communications interface to communicate with external devices, memory, and control circuitry coupled to the communications interface and the memory. The memory stores instructions which, when carried out by the control circuitry, cause the control circuitry to:

(A) receive a call request from a caller device operated by a human caller through the communications interface, the call request including a call button identifier which uniquely identifies a browser call button which is rendered on the caller device to the caller, (B) identify a source phone number based on the call button identifier, and (C) place a call communication to an answerer device operated by a human answerer through the communications interface, the call communication indicating the source phone number as a source of the call communication.

Yet another embodiment is directed to a computer program product having a non-transitory computer readable medium which stores a set of instructions to provide a phone call from a caller device operated by a human caller to an answerer device operated by a human answerer. The set of instructions, when carried out by computerized circuitry, causing the computerized circuitry to perform a method of:

(A) receiving a call request from the caller device, the call request including a call button identifier which uniquely identifies a browser call button which is rendered on the caller device to the caller;

(B) identifying a source phone number based on the call button identifier; and (C) placing a call communication to the answerer device operated by the human answerer, the call communication indicating the source phone number as a source of the call communication.

Another embodiment is directed to a method of configuring a communications system to provide a contextual phone call. The method includes providing, by a user, a browser call button generation command to the communications system, the communications system responding to the browser call button generation command by supplying a set of prompts to the user. The method further includes providing, by the user, configuration data to the communications system in response to the set of prompts to the user, the configuration data including a phone number of the user and a context for a browser call button, the communications system responding to the configuration data by generating a browser call button and adding an entry to a contact list of the user. The method further includes incorporating, by the user, the browser call button into a webpage to subsequently enable an interested viewer of the webpage to actuate the browser call button which, in turn, causes the communications system place a call to the user with the context for the browser call button being displayed to the user via the entry added to the contact list.

It should be understood that, in the cloud context, at least some of the operative circuitry is formed by remote computer resources distributed over a network. Such a computerized environment is capable of providing certain advantages such as distribution of hosted services and resources (e.g., software as a service, platform as a service, infrastructure as a service, etc.), enhanced scalability, etc.

Other embodiments are directed to electronic systems and apparatus, processing circuits, computer program products, and so on. Some embodiments are directed to various methods, caller devices, answerer devices, additional apparatus, electronic components and related circuitry, which are involved in providing a call to a call receiving device which indicates context.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Improved techniques are directed to providing, to a call receiving device, a phone call which indicates context such as information about a particular item on a webpage that a caller is calling about. Accordingly, a human operating the call receiving device knows why the caller is calling and may decide to answer the phone call, or let the call transfer to voicemail (e.g., the human may screen the call and only answer calls regarding certain context). Moreover, the call receiving device may be configured to indicate, in a voicemail listing, the contexts of multiple voicemail messages thus, if the call is not answered, the human is able to screen voicemail messages rather than listen to every voicemail message.

It should be understood that browsers today can make conventional phone calls. Along these lines, when a viewer of a webpage clicks on a browser's "Call Me" button, the viewer is able to call the webpage owner. However, since the browser does not have a phone number, there is no context to the incoming call to the webpage owner.

In contrast, with the improvements disclosed herein, a unique phone number is attached to each browser call button thus providing an opportunity to give context to the receiver/owner of that browser call button when a call is made using that browser call button. Before a more detailed description of the underlying environment and infrastructure is provided, consider the following contrasting use cases.

In a conventional use case, suppose that a real estate agent has five property listings on his/her website with the same conventional "Call Me" button next to each call listing. If an interested client were to click one of the conventional "Call Me" buttons, the real estate agent wouldn't know which property of the five properties the client is calling for unless the real estate agent answers that phone call. Accordingly, the real estate agent is burdened with answering each incoming call in order to prevent missing an important call.

Figure 1:
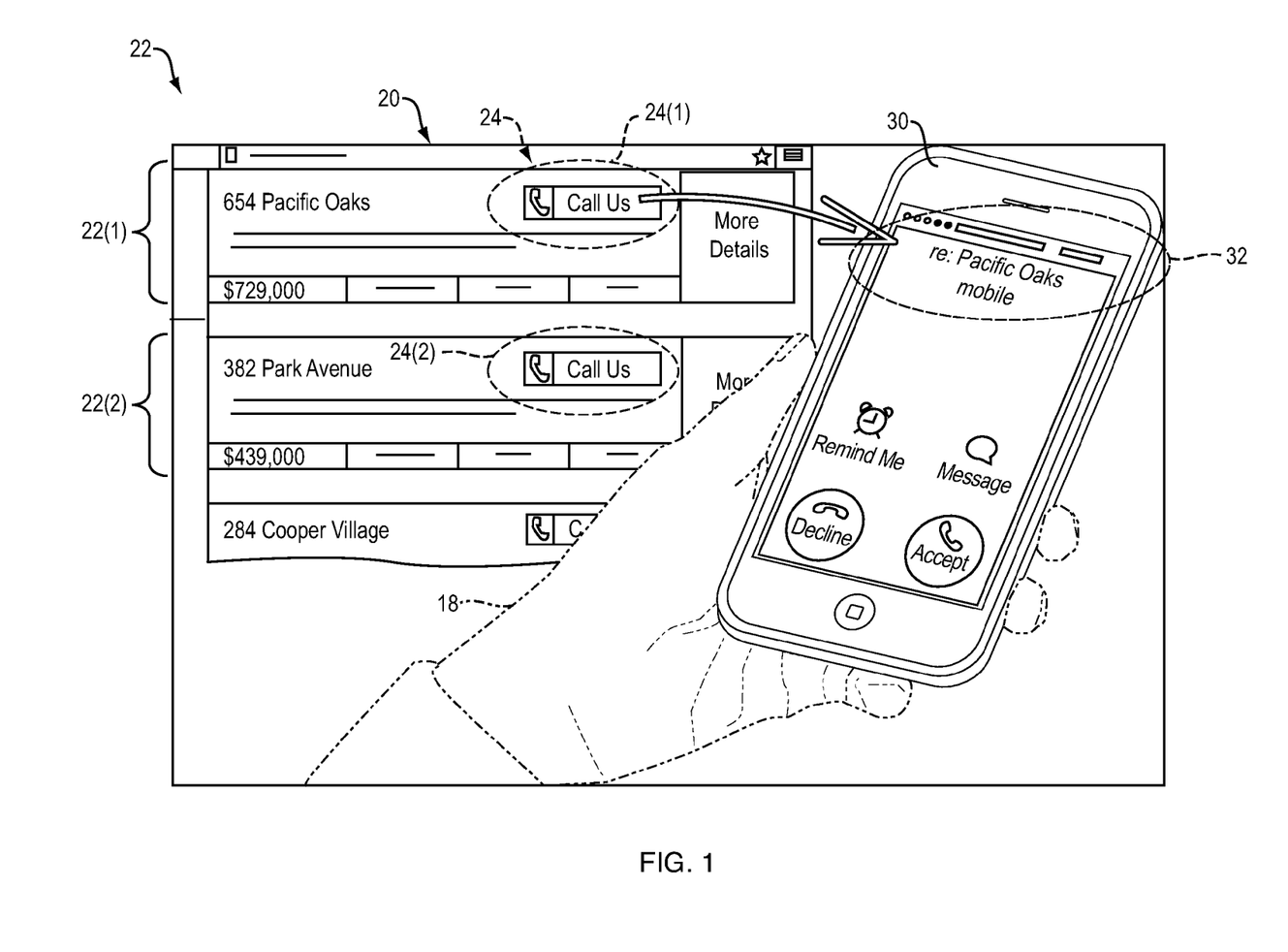
FIG. 1 is a view of an example use case in which a human receives an incoming call and associated context in response to a viewer of a webpage actuating a browser call button.

FIG. 1 shows, in contrast to the conventional use case, a new use case employing improved techniques which enable a human 18 receiving an incoming call to understand the context of that call. In particular, suppose that a real estate agent (i.e., human 18) has multiple property listings on his/her website 20. The property listings are rendered as webpage items 22(1), 22(2), ... (collectively, webpage items 22) which include different browser call buttons 24(1), 24(2), ... (collectively, browser call buttons 24) having unique identifiers corresponding to different source phone numbers. Further suppose that the contact list of the real estate agent's call receiving device 30 (e.g., a smartphone) has been preprogrammed with different contexts 32 associated with the different source phone numbers.

In this situation, when a human viewer is interested in a particular webpage item 22, and clicks on a particular call button 24, the real estate agent's call receiving device 30 is able to associate the particular source phone number of the incoming call with the associated context 32 and thus display that context 32 to the real estate agent. Accordingly, the real estate agent understands why the caller is calling. As a result, the real estate agent may choose to ignore the incoming call if the incoming call is for a property that is no longer for sale (i.e., screen calls).

Figure 2:
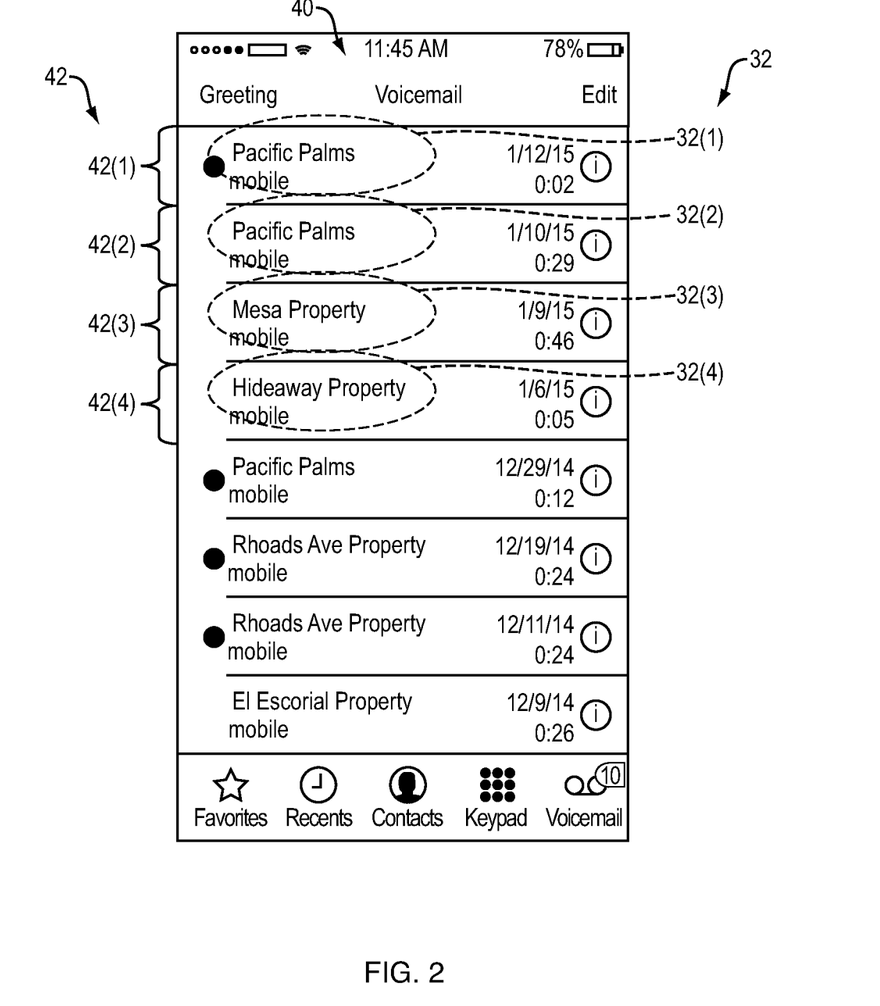
FIG. 2 is a view of a voicemail message list which displays contexts of voicemail messages saved in a voicemail system.

FIG. 2 shows a voicemail listing 40 of voicemail messages left for the real estate agent. Here, the voicemail listing 40 includes voicemail items 42(1), 42(2), 42(3), 42(4), ... (collectively, voicemail items 42) having respective contexts 32(1), 32(2), 32(3), 32(4), ... for individual voicemail messages. Accordingly, the real estate agent is able to screen voicemail messages as well (i.e., play only voicemail messages associated with certain contexts). Further details will now be provided with reference to FIG. 3.

Figure 3:
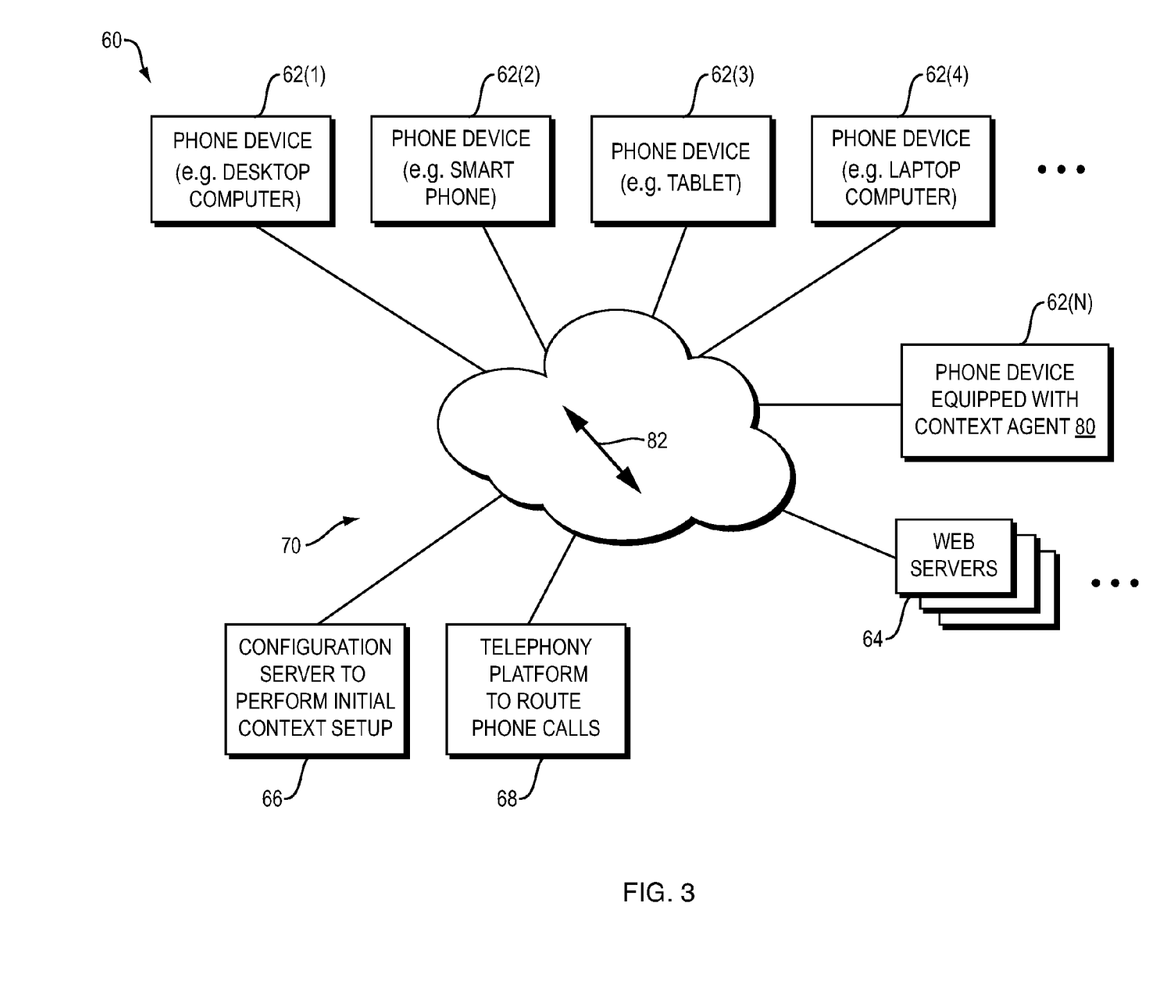
FIG. 3 is a block diagram of a computerized setting which supports calls which include contexts.

FIG. 3 shows a computerized setting 60 which is suitable for employing the improved techniques. The computerized setting 60 includes phone devices 62(1), 62(2), 62(3), 62(4), ... (collectively, phone devices 62), web servers 64, a configuration server 66, telephony platform 68, and communications medium 70.

The phone devices 62 are constructed and arranged initiate and receive phone calls. To initiate calls, the human operators of the phone devices 62 may navigate browsers of the phone devices 62 to webpages with one or more browser call buttons 24 (also see FIG. 1). As is explained in further detail herein, at least one of the phone devices 62 (e.g., see phone device 62(N)) is equipped with a context agent 80 which enables that phone device 62 to be configured to display the context of incoming calls to a user (e.g., also see the human 18 in FIG. 1). Suitable phone devices 62 include desktop computers, laptop computers, tablets, and smartphones, among others.

The web servers 64 are constructed and arranged to serve webpages which include webpage items 22 (e.g., see the property listings in FIG. 1). The webpage items 22 may include the above-mentioned browser call buttons 24 which enable the human operators of the phone devices 62 to initiate calls. That is, as the viewers of the webpages view particular webpage items (e.g., property listings), the viewers are able to click on a particular browser call button 24 for a particular webpage item. The browser call button 24 references code (e.g., call button code which works in coordination with the browser running on the viewer's phone device 62) which establishes a connection from the viewer's phone device 62 to the telephony platform 68 in order to ultimately put the viewer in touch with the webpage owner.

The configuration server 66 is constructed and arranged to perform initial configuration operations to configure the various components of the computerized setting 20 to indicate context during incoming phone calls (i.e., initial context setup). In particular, the configuration server 66 enables humans 18 to create browser call buttons 24, add the browser call buttons 24 to webpages on the web servers 64, and preprogram contact lists on phone devices 62 which are configured with context agents 80. The configuration server 66 may provide other services as well such as initial enrollment, profile management, authentication, and so on.

The telephony platform 68 is constructed and arranged to route and interconnect call requests from call initiating phone devices 62 to call receiving phone devices 62. To this end, the telephone platform 68 maintains a database of entries which attach browser call buttons 24 to source phone numbers to support context indication for incoming calls to phone devices 62 equipped with the context agent 80.

In some arrangements, the configuration server 66 and/or the telephony platform 68 reside in the cloud. Such arrangements enable the associated services to be distributed, to be load balanced, to enjoy fault tolerance, etc.

In some arrangements, the configuration server 66 and the telephony platform 68 are tightly coupled (e.g., reside on the same hardware) thus enabling the equipment to be maintained by a single entity. In other arrangements, configuration server 66 and the telephony platform 68 reside on separate equipment thus enabling each to be maintained by a separate entity (e.g., separate third parties).

The communications medium 70 is constructed and arranged to connect the various components of the computerized setting 60 together to enable these components to exchange electronic signals 82 (e.g., see the double arrow 82). At least a portion of the communications medium 70 is illustrated as a cloud to indicate that the communications medium 70 is capable of having a variety of different topologies including backbone, hub-and-spoke, loop, irregular, combinations thereof, and so on. Along these lines, the communications medium 70 may include copper-based data communications devices and cabling, fiber optic devices and cabling, wireless devices, combinations thereof, etc. Furthermore, the communications medium 70 is capable of supporting LAN-based communications, cellular communications, combinations thereof, etc.

During operation, a user of a phone device 62 which is equipped with a context agent 80 (e.g., see phone device 62(N) in FIG. 1) performs a registration operation with the configuration server 66 to configure the various components of the computerized setting 60 to provide a contextual phone call. In particular, after appropriate enrollment and authentication, the user issues/initiates a browser call button generation command to the configuration server 66. The configuration server 66 responds to the browser call button generation command by supplying a set of prompts to the user.

In response to the set of prompts, the user provides configuration data back to the configuration server 66. In particular, the user provides a phone number of the user's phone device 62 (i.e., the phone number of the phone device 62(N) in FIG. 1) and a context for a browser call button 24 (e.g., a particular property listing of a real estate agent). The user may provide this information as well as other information by filling in a set of fields/forms/etc. on one or more webpages provided by the configuration server 66.

The configuration server 66 responds by generating a browser call button 24 and adding an entry to a contact list on the user's phone device 62. To generate the browser call button 24, the configuration server 66 adds an entry to a database of the telephony platform 68. In particular, the database entry maps (or associates) a unique identifier to a particular source phone number. The configuration server 66 then programs the browser call button 24 with code to provide the unique identifier to the telephony platform 68 when the browser call button 24 is clicked. The user is now able to place the browser call button 24 on a webpage and update his/her website.

To add an entry to the contact list on the user's phone device 62, the configuration server 66 communicates with the context agent 80 on the user's phone device 62. In particular, the configuration server 66 directs the context agent 80 to access the contact list (e.g., add or update an entry in the contact list with the context) so that when the phone device 62 subsequently receives an incoming call from a particular source phone number, the phone device 62 displays the context for the browser call button 24 which was provided by the user.

Next, the user incorporates the browser call button 24 into a webpage to subsequently enable an interested viewer of the webpage to actuate the browser call button 24 when the interested viewer wishes to make a call (e.g., as a question, make a purchase, etc.). When such actuation occurs, the browser call button 24 sends a call request having the unique identifier to the telephony platform 68 which, in turn, places a call to the user using the source phone number which is mapped to that unique identifier. The user's phone device 62 processes the incoming call by finding the source phone number in the user's contact list and displaying the context for the browser call button 24. Accordingly, the user is able to understand the context of the incoming call.

It should be understood that the configuration server 66, the telephony platform 68 and the user's phone device 62 are provisioned with appropriate security mechanisms to prevent these components from being compromised. Suitable security mechanisms include initial authentication mechanisms to enable the user to sign-on and perform the registration process, certificates to enable secure/trusted communications between devices, and cryptographic measures to protect confidential data. Other security mechanisms are suitable for use as well. Further details will now be provided with reference to FIG. 4.

Figure 4:
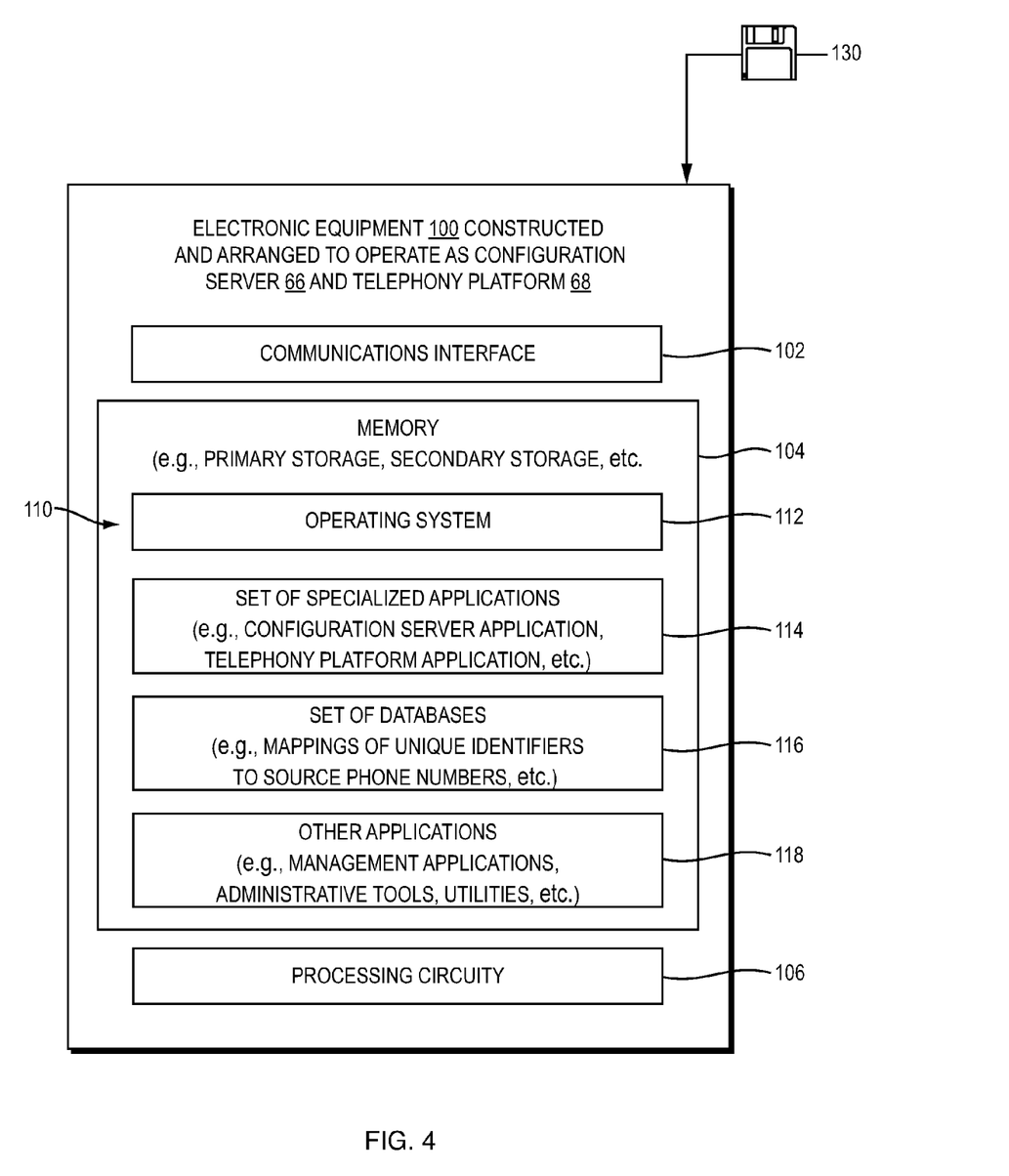
FIG. 4 is a block diagram of electronic equipment which is capable of being used in the computerized setting of FIG. 3.

FIG. 4 shows particular details of an electronic equipment 100 which is capable of operating as the configuration server 66 and the telephone platform 68. The electronic equipment 100 includes a communications interface 102, memory 104, and processing circuitry 106. Suitable form factors for the electronic equipment 100 include a mainframe, a set of blade servers, a server farm, a hardware platform providing a virtual environment and running virtual machines, distributed hardware devices, the cloud, combinations thereof, and so on.

The communications interface 102 is constructed and arranged to connect the electronic equipment 100 to the communications medium 70 (FIG. 3). Accordingly, the communications interface 102 enables the electronic equipment 100 to communicate with the other components of the computerized setting 20 (FIG. 3). Such communications may be line-based or wireless (i.e., IP-based, cellular, combinations thereof, and so on).

The memory 104 is intended to represent both volatile storage (e.g., DRAM, SRAM, etc.) and non-volatile storage (e.g., flash memory, magnetic disk drives, etc.). The memory 104 stores a variety of software constructs 110 including an operating system 112, a set of specialized applications 114, a set of databases 116, and other applications 118.

The processing circuitry 106 is constructed and arranged to operate in accordance with the various software constructs 110 stored in the memory 104. In particular, the processing circuitry 106, when executing the operating system 112, manages various resources of the electronic equipment 100 (e.g., memory allocation, processor cycles, etc.). Additionally, the processing circuitry 106 operating in accordance with the set of applications 114 forms specialized control circuitry to enable the electronic equipment 100 to operate as the configuration server 66 and/or the telephony platform 68. The set of databases 116 includes database entries such as mappings which map unique identifiers (IDs) of the browser call buttons 24 (FIG. 1) to source phone numbers (e.g., each mapping being a database entry). Furthermore, the processing circuitry 106, when operating in accordance with the other applications 118, enables performance of other activities such as administrative tasks, user enrollment, storage of context for each browser call button 24, and so on.

It should be understood that the above-mentioned processing circuitry 106 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 130 is capable of delivering all or portions of the software to the electronic equipment 100. The computer program product 130 has a non-transitory and non-volatile computer readable medium which stores a set of instructions to control one or more operations of the electronic equipment 100. Examples of suitable computer readable storage media include tangible articles of manufacture and apparatus which store instructions in a non-volatile manner such as CD-ROM, flash memory, disk memory, tape memory, and the like. Further details will now be provided with reference to FIG. 5.

Figure 5:
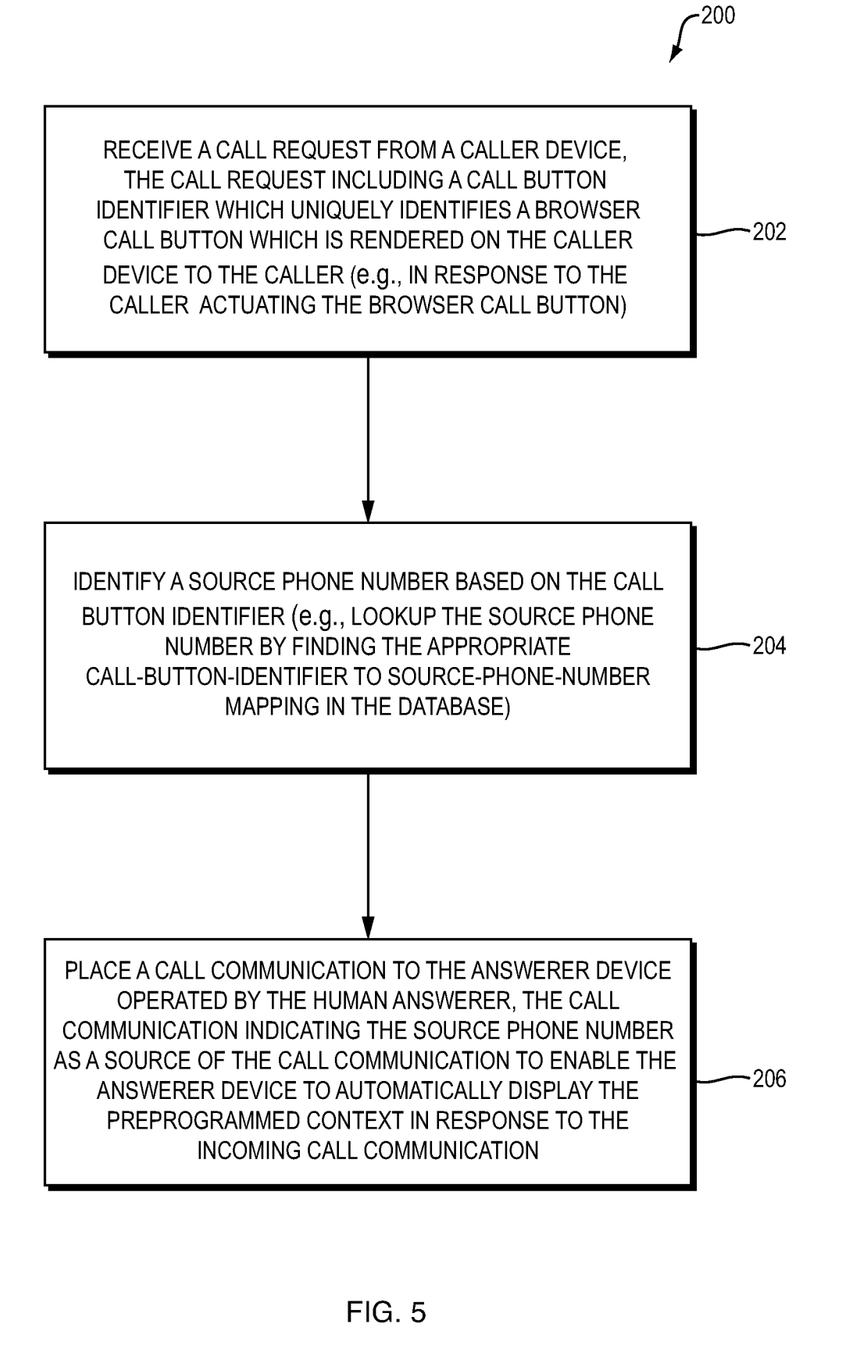
FIG. 5 is a flowchart of a procedure which is performed by the computerized setting of FIG. 3.

FIG. 5 is a flowchart of a procedure 200 which is performed by the computerized setting 20 to provide a phone call from a caller device operated by a human caller to an answerer device operated by a human answerer. At 202, the electronic equipment 100 receives a call request from the caller device. The call request includes a call button identifier which uniquely identifies a browser call button which is rendered on the caller device to the caller (or otherwise made available to the caller).

At 204, the electronic equipment 100 identifies a source phone number based on the call button identifier. Here, the appropriate database entry is found which maps the unique identifier to the source phone number.

At 206, the electronic equipment 100 places a call communication to the answerer device operated by the human answerer. The call communication (i.e., an incoming call to the answerer device) indicates the source phone number as a source of the call communication. Accordingly, if the answerer device already has the context of associated with the source phone number already saved (e.g., as a contact in a contact list), the answerer device is able to automatically display that context in response to the incoming call.

As described above, improved techniques are directed to providing, to a call receiving device 62, a phone call which indicates (e.g., displays) context such as information about a particular item on a webpage that a caller is calling about. Accordingly, the human operating the call receiving device 62 knows why the caller is calling and may decide to answer the phone call, or let the call transfer to voicemail (i.e., the human may screen the call and only answer calls regarding certain contexts). Moreover, the call receiving device 62 may be configured to display, in a voicemail listing (FIG. 2), the contexts of multiple voicemail messages thus alleviating the human from having to listen to every voicemail message.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the computerized setting 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that browsers today can make conventional phone calls to cell phones. The conventional incoming call from a browser's "Call Me" button has no associated context because the browser does not have a phone number. However, in accordance with an improved embodiment, a unique phone number can be attached to each browser call button, giving context to the receiver/owner of each browser call button.

It should be further understood that today website owners use conventional "Call Me" buttons on their websites which help website visitors easily reach out to the website owners. However, since browsers have no phone numbers associated, the website owners do not clearly have any context around incoming calls from those conventional "Call Me" buttons.

As mentioned earlier in the real estate agent conventional use case, the real estate agent may have multiple listings on his/her website with the same conventional "Call Me" buttons next to each call listing. As a result, if an interested client were to click one of the "Call Me" buttons, the real estate agent wouldn't know which property the client is calling for unless he/she answers that phone call.

However, in accordance with some of the embodiments disclosed herein, unique phone numbers are associated with each browser call button. This way when someone clicks a browser call button, a web call is made to a telephony platform, which in-turn uniquely identifies the button from where the call is being made. An example platform which can be configured to operate in this way is the open-source FreeSwitch platform. From that button, the telephony platform finds the source phone number associated with that specific browser call button. The telephony platform then calls the website owner, as well as bridges the web call to the phone call.

The website owner's phone already has a contact saved for that incoming source phone number with context associated around that browser call button. Accordingly, the website owner's phone displays the context thus enabling the website owner to screen the incoming call (also see FIG. 1).

Figure 6:
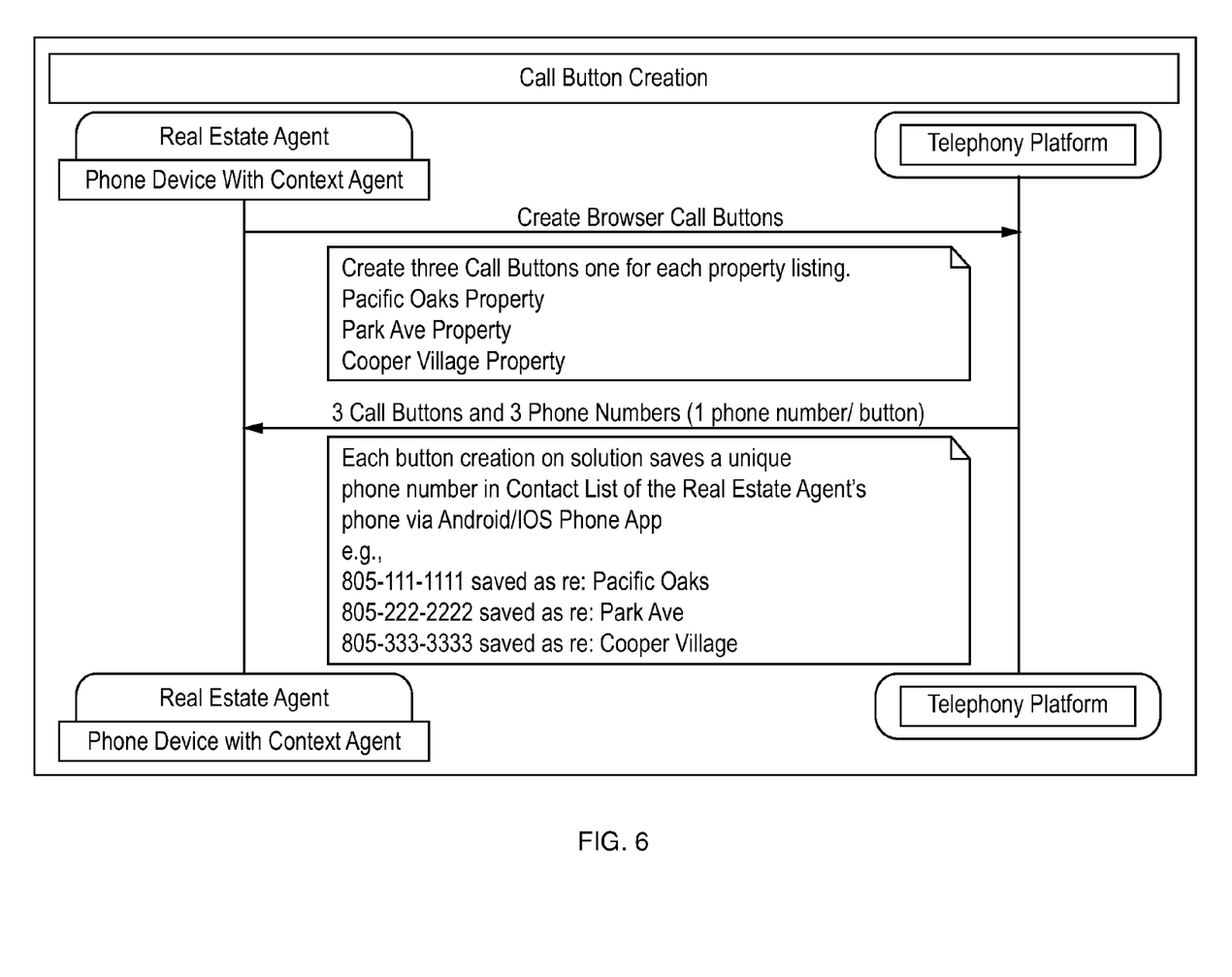
FIG. 6 is a sequence diagram illustrating activities which are performed to provision/create a call button in the computerized setting of FIG. 3.

FIG. 6 shows an example flow with a phone device which is to receive context with incoming calls, e.g., a real estate agent's smartphone (also see phone device 62(N) in FIG. 3). In particular, suppose that a viewer of the real estate agent's website views three properties offered by the real estate agent (FIG. 1). First, the real estate agent creates three browser call buttons, one for each property listing for his/her website.

So now when a real estate client interested in Pacific Oaks Property calls using the browser call button for that property, the real estate agent's phone will clearly show what the call is about. Now if this were a property already in escrow, he/she can ignore that call without answering saving valuable time. This provides great call screening without having to answer the call (FIG. 1).

Figure 7:
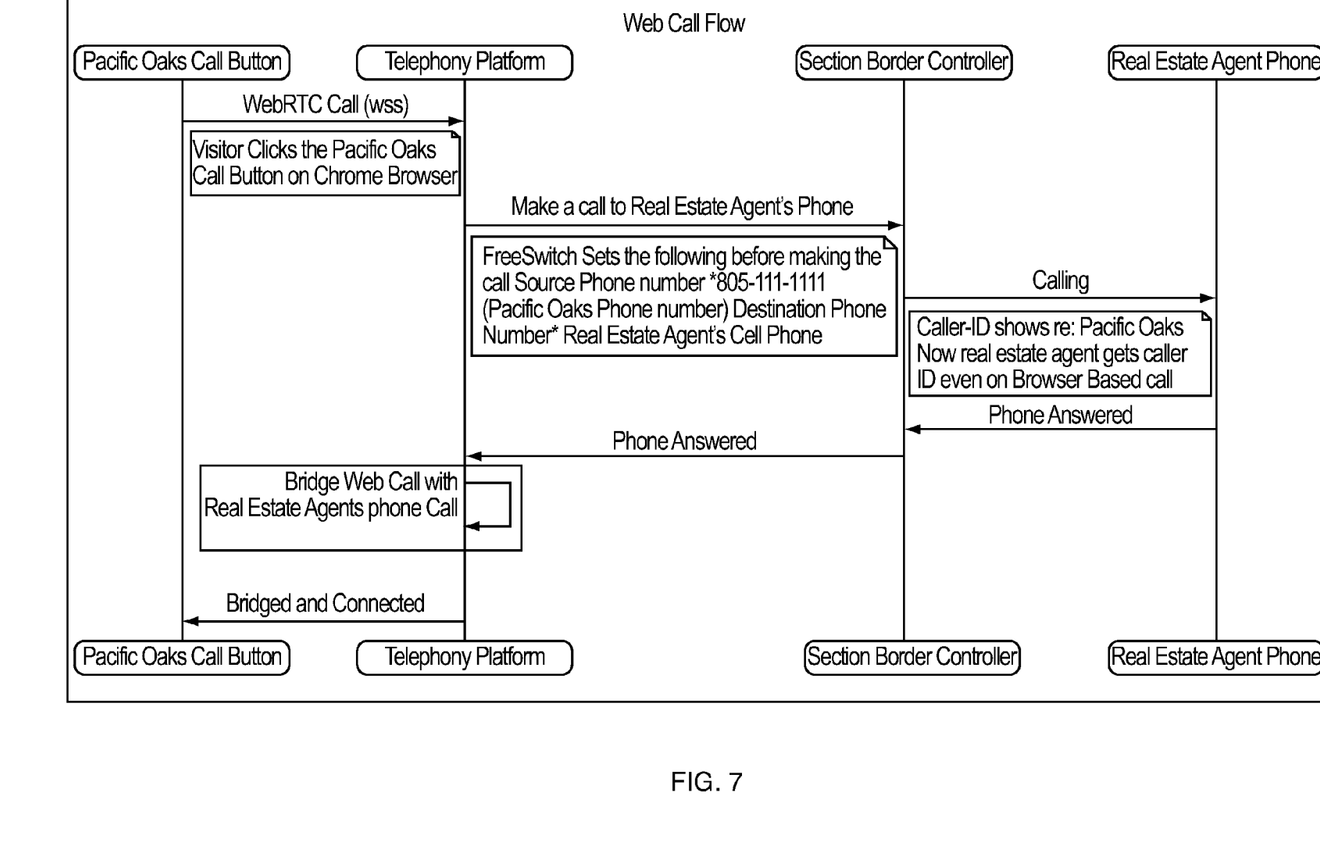
FIG. 7 is a sequence diagram illustrating activities which are performed in the computerized setting of FIG. 3 when providing a call with context.

FIG. 7 shows a technical flow for a web call. It should be understood that the same context can also be applied to voicemails left via web calls on cell phones. Even though browsers don't have phone numbers, the voicemails left behind can have some context associated with them (also see FIG. 2).

It should be understood that, although a smartphone was shown as a call receiving device which displays context, a variety of other devices are suitable as a call receiving device which displays context. Examples include desktop computers, tablets, laptop computers, and similar smart devices.

It should be further understood that, in addition to adding entries to the contact list on the user's phone device 62, the configuration server 66 is able to delete and/or modify the added entries. Accordingly, the configuration server 66 is well-equipped to update or revise the context of particular entries, as well as delete entries when the user is no longer interested in receiving context for those entries.

Additionally, it should be understood that, before a call is placed, the electronic equipment 100 (FIG. 4) may prompt the caller to enter certain identifying information such as the caller's email address. In response that identifying information, the electronic equipment 100 gathers information regarding the caller (e.g., context, the caller's name, a profile or listing that the caller has posted in a public database such as a social media site, and so on). The electronic equipment 100 then bundles this information together and forwards the information to the call recipient (e.g., as a Short Message Service communication, as an email message, etc.). Accordingly, the call recipient has additional caller information available to enable the recipient to better understand the nature of the call. Such modifications and enhancements are intended to belong to various embodiments of the disclosure.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

What is claimed is:

1. A computer-implemented method of providing a phone call from a caller device operated by a human caller to an answerer device operated by a human answerer, the method comprising:
   receiving, by processing circuitry, a call request from the caller device, the call request including a call button identifier that uniquely identifies a browser call button that is rendered on the caller device to the caller;
   identifying, by the processing circuitry, a source phone number based on the call button identifier; and
   placing, by the processing circuitry, a call communication to the answerer device operated by the human answerer, the call communication indicating the source phone number as a source of the call communication;
   wherein the method further comprises:
   prior to receiving the call request, programming a contact list of the answerer device with an association between (i) the source phone number and (ii) a context for the browser call button to direct the answerer device to display the context to the human answerer in response to the answerer device receiving the call communication,
   prior to programming the contact list of the answerer device, receiving a button registration request from the human answerer, and
   in response to the button registration request, (i) adding an entry to a database, the entry associating the call button identifier with the source phone number, (ii) initiating a contact list programming operation to program the contact list of the answerer device with the association, and (iii) providing the human answerer with a button object to deploy on a webpage as the browser call button, the button object including the call button identifier.

2. A computer-implemented method as in claim 1 wherein identifying the source phone number includes:
   searching the database based on the call button identifier to retrieve the entry associating the call button identifier with the source phone number among other entries of the database, and
   extracting the source phone number from the entry to use the source phone number as a caller identifier of the call communication to the answerer device.

3. A computer-implemented method as in claim 1 wherein the webpage includes multiple existing button objects which have been deployed as browser call buttons, each of the existing button objects having an identical graphical appearance on the webpage; and wherein providing the human answerer with the button object includes:
   provisioning the button object to have the identical graphical appearance as the existing button objects.

4. A computer-implemented method as in claim 1 wherein placing the call communication to the answerer device includes:
   providing the source phone number as a caller identifier of the call communication to the answerer device to enable the answerer device to (i) retrieve the context for the browser call button from the contact list and (ii) display the context for the browser call button to enable the answerer to screen the call communication.

5. A computer-implemented method as in claim 4 wherein placing the call communication to the answerer device continues until the answerer operates the answerer device to answer the call communication.

6. A computer-implemented method as in claim 4 wherein placing the call communication to the answerer device continues until the call communication is processed by a voicemail service of the answerer, the voicemail service of the answer displaying, in a voice message listing on the answerer device, a voice message item having the context for the browser call button.

7. A computer-implemented method as in claim 1 wherein the caller device includes phone circuitry that makes and receives phone calls via a caller device phone number which is assigned to the phone circuitry; and
   wherein placing the call communication to the answerer device includes sending, as the source phone number, a particular phone number to the answerer device, the particular phone number being different from the caller device phone number.

8. A computer-implemented method as in claim 1 wherein the caller device includes browser circuitry that enables the caller device to make and receive web-based calls without using a phone number; and
   wherein placing the call communication to the answerer device includes sending, as the source phone number, a particular phone number to the answerer device, the caller device being unable to receive phone calls via the particular phone number.

9. An electronic apparatus, comprising:
   a communications interface to communicate with external devices;
   memory; and
   control circuitry coupled to the communications interface and the memory, the memory storing instructions which, when carried out by the control circuitry, cause the control circuitry to:
   receive a call request from a caller device operated by a human caller through the communications interface, the call request including a call button identifier that uniquely identifies a browser call button that is rendered on the caller device to the caller,
   identify a source phone number based on the call button identifier, and
   place a call communication to an answerer device operated by a human answerer through the communications interface, the call communication indicating the source phone number as a source of the call communication;
   wherein the memory stores instructions which, when carried out by the control circuitry, further cause the control circuitry to:
   prior to receiving the call request, program a contact list of the answerer device with an association between (i) the source phone number and (ii) a context for the browser call button to direct the answerer device to display the context to the human answerer in response to the answerer device receiving the call communication, prior to programming the contact list of the answerer device, receive a button registration request from the human answerer, and in response to the button registration request, (i) add an entry to a database, the entry associating the call button identifier with the source phone number, (ii) initiate a contact list programming operation to program the contact list of the answerer device with the association, and (iii) provide the human answerer with a button object to deploy on a webpage as the browser call button, the button object including the call button identifier.

10. An electronic apparatus as in claim 9 wherein the control circuitry, when placing the call communication to the answerer device, is constructed and arranged to:

provide the source phone number as a caller identifier of the call communication to the answerer device to enable the answerer device to (i) retrieve the context for the browser call button from the contact list and (ii) display the context for the browser call button to enable the answerer to screen the call communication.

11. An electronic apparatus as in claim 9 wherein the caller device includes phone circuitry that makes and receives phone calls via a caller device phone number which is assigned to the phone circuitry; and wherein the control circuitry, when placing the call communication to the answerer device, is constructed and arranged to send, as the source phone number, a particular phone number to the answerer device, the particular phone number being different from the caller device phone number.

12. An electronic apparatus as in claim 9 wherein the caller device includes browser circuitry that enables the caller device to make and receive web-based calls without using a phone number; and wherein the control circuitry, when placing the call communication to the answerer device, is constructed and arranged to send, as the source phone number, a particular phone number to the answerer device, the caller device being unable to receive phone calls via the particular phone number.

13. A computer program product having a non-transitory computer readable medium which stores a set of instructions to provide a phone call from a caller device operated by a human caller to an answerer device operated by a human answerer, the set of instructions, when carried out by computerized circuitry, causing the computerized circuitry to perform a method of:

receiving a call request from the caller device, the call request including a call button identifier that uniquely identifies a browser call button that is rendered on the caller device to the caller;

identifying a source phone number based on the call button identifier; and placing a call communication to the answerer device operated by the human answerer, the call communication indicating the source phone number as a source of the call communications; wherein the method further comprises:

prior to receiving the call request, programming a contact list of the answerer device with an association between (i) the source phone number and (ii) a context for the browser call button to direct the answerer device to display the context to the human answerer in response to the answerer device receiving the call communication, prior to programming the contact list of the answerer device, receiving a button registration request from the human answerer, and in response to the button registration request, (i) adding an entry to a database, the entry associating the call button identifier with the source phone number, (ii) initiating a contact list programming operation to program the contact list of the answerer device with the association, and (iii) providing the human answerer with a button object to deploy on a webpaqe as the browser call button, the button object including the call button identifier.

14. A method of configuring a communications system to provide a contextual phone call, the method comprising:

providing, by a user, a browser call button generation command to the communications system, the communications system responding to the browser call button generation command by supplying a set of prompts to the user;

providing, by the user, configuration data to the communications system in response to the set of prompts to the user, the configuration data including a phone number of the user and a context for a browser call button, the communications system responding to the configuration data by generating a browser call button and adding an entry to a contact list of the user; and incorporating, by the user, the browser call button into a webpage to enable an interested viewer of the webpage to actuate the browser call button which, in turn, causes the communications system place a call to the user with the context for the browser call button being displayed to the user via the entry added to the contact list.

15. A computer program product as in claim 13 wherein identifying the source phone number includes:

searching the database based on the call button identifier to retrieve the entry associating the call button identifier with the source phone number among other entries of the database, and extracting the source phone number from the entry to use the source phone number as a caller identifier of the call communication to the answerer device.

16. A computer program product as in claim 13 wherein the webpage includes multiple existing button objects which have been deployed as browser call buttons, each of the existing button objects having an identical graphical appearance on the webpage; and wherein providing the human answerer with the button object includes:

provisioning the button object to have the identical graphical appearance as the existing button objects.

17. A computer program product as in claim 13 wherein placing the call communication to the answerer device includes:

providing the source phone number as a caller identifier of the call communication to the answerer device to enable the answerer device to (i) retrieve the context for the browser call button from the contact list and (ii) display the context for the browser call button to enable the answerer to screen the call communication.

18. A computer program product as in claim 17 wherein placing the call communication to the answerer device continues until the answerer operates the answerer device to answer the call communication.

19. A computer program product as in claim 17 wherein placing the call communication to the answerer device continues until the call communication is processed by a voicemail service of the answerer, the voicemail service of the answer displaying, in a voice message listing on the answerer device, a voice message item having the context for the browser call button.

20. A computer program product as in claim 13 wherein the caller device includes phone circuitry that makes and receives phone calls via a caller device phone number which is assigned to the phone circuitry; and     wherein placing the call communication to the answerer device includes sending, as the source phone number, a particular phone number to the answerer device, the particular phone number being different from the caller device phone number.

21. A computer program product as in claim 13 wherein the caller device includes browser circuitry that enables the caller device to make and receive web-based calls without using a phone number; and     wherein placing the call communication to the answerer device includes sending, as the source phone number, a particular phone number to the answerer device, the caller device being unable to receive phone calls via the particular phone number.

\* \* \* \* \*